United States Patent [19]

Fenner

[11] 4,283,377

[45] Aug. 11, 1981

[54] PROCESS FOR THE PREPARATION OF BASIC ZIRCONIUM CARBONATE OF HIGH PURITY

[75] Inventor: Jürgen Fenner, Essen, Fed. Rep. of Germany

[73] Assignee: Th. Goldschmidt AG, Essen, Fed. Rep. of Germany

[21] Appl. No.: 163,406

[22] Filed: Jun. 26, 1980

[30] Foreign Application Priority Data

Jul. 5, 1979 [DE] Fed. Rep. of Germany ....... 2927128

[51] Int. Cl.$^3$ ...................... C01B 31/24; C01B 17/90
[52] U.S. Cl. ................. 423/419 P; 423/544; 423/608
[58] Field of Search ...................... 423/419 P, 544, 608

[56] References Cited

U.S. PATENT DOCUMENTS

| | | | |
|---|---|---|---|
| 1,316,107 | 9/1919 | Pugh | 423/544 |
| 1,494,426 | 9/1924 | Kinze | 423/552 |
| 2,201,508 | 5/1940 | Tyrer | 423/544 |
| 2,294,431 | 9/1942 | Wainer | 423/544 |
| 3,168,374 | 2/1965 | Meyer-Simon et al. | 423/544 |
| 3,510,254 | 5/1970 | Bell | 423/544 |
| 3,961,026 | 6/1976 | Pokhodewko et al. | 423/419 P |

FOREIGN PATENT DOCUMENTS

| | | | |
|---|---|---|---|
| 4403 | 3/1979 | European Pat. Off. | 423/419 P |
| 45-8089 | 3/1970 | Japan | 423/608 |

Primary Examiner—O. R. Vertiz
Assistant Examiner—Gary P. Straub

[57] ABSTRACT

A method for preparing a high purity basic zirconium carbonate comprising (a) adding alkali or ammonium carbonate or alkali or ammonium hydrogen carbonate to an aqueous solution of zirconium sulfate to precipitate basic zirconium sulfate;

(b) dissolving the basic zirconium sulfate in HCl solution and heating the solution to reprecipitate the basic zirconium sulfate;

(c) suspending the precipitated basic zirconium sulfate in water and adding alkali or ammonium carbonate or alkali or ammonium hydrogen carbonate to the suspension to produce basic zirconium carbonate.

The process provides a simple and economical means of producing a very high purity basic zirconium carbonate.

14 Claims, No Drawings

PROCESS FOR THE PREPARATION OF BASIC ZIRCONIUM CARBONATE OF HIGH PURITY

BACKGROUND OF THE INVENTION

1. Field of the Invention

The invention relates to a process for the preparation of high purity basic zirconium carbonate. The basic zirconium carbonate generally corresponds to the formula $$Zr_2O_3(OH)_2 \cdot CO_2 \cdot 7H_2O$$

2. Description of the Prior Art

Basic zirconium carbonate is used in the form of an aqueous paste in the textile industry in finishing processes. It is additionally an important intermediate for the preparation of other zirconium salts which are prepared from the basic zirconium carbonate, for example, by the action of acid. Basic zirconium carbonate may in addition be converted into zirconium oxide by calcining which has attained importance, especially in the ceramics industry. In many cases, a zirconium compound of high purity is required. The purity requirements for zirconium oxide which is intended to be used in electroceramics are particularly high.

Because basic zirconium carbonate is partially used as is and partially as an intermediate, there is considerable interest in preparing this product in high purity.

It is possible to produce very pure zirconium tetrachloride by repeated sublimation in an atmosphere of hydrogen and to convert this by known procedures into the oxide. This process, however, is too expensive for practical purposes.

The preparation of solutions of very pure zirconium oxychloride by the repated recrystallization of the oxychlorides is known. This procedure is also very complicated and consequently, too expensive for industrial application.

German Offenlegungsschrift No. 28 54 200 discloses a process for the preparation of zirconium oxide in which technical calcium zirconate is the starting material. After being dissolved in hydrochloric acid, the basic zirconium sulfate is precipitated and then, reprecipitated as the basic zirconium carbonate. Finally, the material is calcined. In the practical application of this process, however, difficulties arise in the precipitation of the basic zirconium sulfate. Particularly, one either obtains a product of high purity, but low yield, or a slightly contaminated product, which is precipitated almost quantitatively, depending on the fluoride content.

SUMMARY OF THE INVENTION

We have discovered a process for obtaining basic zirconium carbonate in high purity which is relatively simple and economical. More particularly, the present process comprises the steps of:

(a) precipitating basic zirconium sulfate from an aqueous solution of zirconium sulfate by the addition of a compound selected from the group consisting of at least equimolar quantities of alkali or ammonium carbonate and twice the molar quantity of alkali or ammonium hydrogen carbonate, and then separating the precipitate from the mother liquor;

(b) dissolving the basic zirconium sulfate at temperatures not greater than 40° C. in an amount of 0.3 N to 1 N HCl such that there are 0.5 to 1.5 liters of the HCl solution for each mole of zirconium sulfate used in step (a) and then heating the solution to a temperature of at least 45° C., whereby the basic zirconium sulfate is again precipitated and separating the precipitate; and (c) suspending the basic zirconium sulfate in water to which the corresponding amount of alkali or ammonium carbonate or alkali or ammonium hydrogen carbonate has been added, and removing the basic zirconium carbonate formed from the solution.

DESCRIPTION OF THE PREFERRED EMBODIMENT

In step (a) of the inventive process, it is advisable to use a freshly prepared solution of zirconium sulfate because aging can lead to increase in the size of the molecules, and can result in a lowering of the yield during precipitation. It has proven to be particularly advisable to work with 0.5 to 1 molar solutions of zirconium sulfate.

Preferably, the basic zirconium sulfate is precipitated in the presence of alkali or ammonium chloride, which is added to the aqueous solution in amounts of from 0.5 to 1 mole relative the the zirconium sulfate. On the one hand, this additon causes the basic zirconium sulfate to be precipitated in an easily filterable form and, on the other hand, it counteracts the aging of the zirconium sulfate in solution.

In step (b), the basic zirconium sulfate, which has been obtained in step (a), is dissolved in dilute, aqueous hydrochloric acid, the hydrochloric acid preferably having a concentration of from 0.5 N to 0.7 N. Concentrations of hydrochloric acid higher than 1 N are not recommended because such concentrations would lower the yield in the reprecipitation step (b). For each mole of the zirconium sulfate used in step (a), it is advisable to use 0.5 to 1.5 liters of the aqueous hydrochloric acid solution. In a preferred version of the inventive process, alkali or ammonium chloride, especially, however, ammonium chloride, is, in turn, added to this hydrochloric acid in amounts of 20 to 70 g/l of hydrochloric acid. As a consequence of this addition, the basic zirconium sulfate precipitates in a readily filterable form and impurities, such as, for example, iron ions, remain in solution.

The basic zirconium sulfate is dissolved at as low a temperature as possible. A temperature of 40° C. should not be exceeded. Otherwise, the purification effect would be decreased. If these solutions are now heated to temperatures of 50° C. and higher, basic zirconium sulfate is reprecipitated in pure form. Preferably, the solution is heated to 70° to 90° C. in order to obtain as high a yield as possible. The precipitated zirconium sulfate can be removed from the mother liquor by filtration, centrifuging, or any other suitable method. The isolated, basic zirconium sulfate may be washed with water.

If the purity specifications of the product are particularly demanding, it is, of course, possible to repeat steps (a) and (b) or only step (b). If steps (a) and (b) are to be repeated, the precipitated basic zirconium sulfate is dissolved in sulfuric acid and converted into neutral zirconium sulfate, with which the process is then repeated. If only process step (b) is to be repeated, the precipitated basic zirconium sulfate is dissolved once again in 0.3 N to 1 N HCl and the procedure of step (b) is repeated.

The basic zirconium sulfate is suspended in water in process step (c). Preferably, about 0.1 mole of the basic zirconium sulfate is suspended in 0.5 to 1 liter of water. Alkali or ammonium carbonate or alkali or ammonium hydrogen carbonate is now added to the suspension. In so doing, the amount of carbonate or hydrogen carbonate added should correspond to the amount of basic zirconium sulfate at least in the sense of a stoichiometric relationship. The composition of the basic zirconium sulfate may vary and should therefore be determined by analysis. In the usual case, it may be assumed that the basic zirconium sulfate is present as $(ZrO_2)_5(SO_3)_3 \cdot xH_2O$. In this case, 3 moles of the carbonate or 6 moles of the hydrogen carbonate are advisably added per mole of the basic zirconium sulfate.

For the further processing of the basic zirconium carbonate, and especially, if the basic zirconium carbonate is to be converted into the oxide, the use of the corresponding ammonium carbonate or ammonium hydrogen carbonate is recommended.

Particularly good yields and a product which can be filtered especially well are obtained when ammonium hydrogen carbonate is used. It is therefore preferable, when using ammonium carbonate, to introduce $CO_2$ during the precipitation reaction in order to obtain the hydrogen carbonate in situ in this manner.

The amount of the purification effect achieved by the process of the present invention is seen from the following comparison of crude and purified products.

|  | Starting Material $Zr(SO_4)_2 \cdot 4H_2O$ | End Product Basic Zirconium Carbonate |
|---|---|---|
|  | In each case, the data refers to the $ZrO_2$ content | |
| $Fe_2O_3$ | 0.25% | $\leq 0.02\%$ |
| $SiO_2$ | 0.15% | $\leq 0.05\%$ |
| $TiO_2$ | 0.10% | $\leq 0.04\%$ |
| CaO | 0.20% | $\leq 0.02\%$ |

The following examples illustrate the present process:

EXAMPLE 1

Technically pure zirconium sulfate (356.6 g) is dissolved with stirring in 1.5 l of water and filtered until clear. After the addition of 50 g of sodium chloride, the solution is stirred vigorously, treated portionwise with a total of 148.4 g of sodium carbonate and then stirred for approximately a further 20 minutes. The precipitate is subsequently filtered off and washed with water.

The moist filter cake is suspended in 1 liter of water, mixed with 70 g of sodium chloride and 50 ml (ca. 59 g) of concentrated hydrochloric acid and warmed slightly with stirring. The suspended basic zirconium sulfate (polysulfatopolyzirconylic acid) dissolves at temperatures of about 30° C. On further heating, it precipitates again at about 50° C. in an easily filterable form. After about 10 minutes of heating to 85° to 95° C., the precipitate is filtered from the solution, washed with water and suspended once again in 1 liter of water.

After the portionwise addition of 100.8 g of sodium hydrogen carbonate to the suspension, stirring is continued for about an additional 30 minutes. The suspension is then filtered and the filter cake is washed with water until free of sulfate. A pure, white, basic zirconium carbonate (carbonated trioxyzirconiumdihydroxy heptahydrate) is obtained, which, in the moist state, is readily soluble and forms a clear solution, for example, in acetic acid and mineral acids. By calcining at about 1000° C., 122 to 124 g of a hafnium-containing zirconium oxide of high purity are obtained.

EXAMPLE 2

Technically pure zirconium sulfate (290 g) is dissolved in 1 liter of water and filtered until clear as described in Example 1. First ammonium chloride (30 g) and then, portionwise, ammonium carbonate (129.9 g) are added to the solution.

After about 30 minutes, the precipitate is filtered off, washed and subsequently suspended in 0.8 liter of a 0.5 N hydrochloric acid with the addition of 30 g of ammonium chloride. By so doing, the basic zirconium sulfate is at least partially dissolved. The dissolving process is completed, if necessary, by subsequent heating to about 30° C. On further heating to at least 50° C., there is renewed precipitation.

The suspension is heated with stirring to more than 80° C., subsequently mixed with about 500 ml of water in order to cool it slightly and filtered. After the moist filter cake is washed, it is suspended in about 1 liter of water and reprecipitated with stirring by the portionwise addition of 7.22 g of ammonium hydrogen carbonate. After about 30 minutes, the precipitate is filtered off and washed until free from sulfate. When the basic carbonate is calcined at about 1000° C., ca. 100 g of practically alkali oxide-free zirconium oxide is obtained.

EXAMPLE 3

As in Example 1, basic zirconium sulfate, prepared from 356.6 g of zirconium sulfate, is suspended in 1 liter of water in order to purify it and dissolved by the addition of 40 g of ammonium chloride and 40 ml of 12 N hydrochloric acid at 30° C. to 40° C. After reprecipitating by heating to a temperature of 50° C. or more, the suspension is heated for about 15 minutes with stirring to a temperature of about 80° C. After cooling slightly, the purified basic zirconium sulfate is filtered off and washed with water.

The moist filter cake is reprecipitated at room temperature from its solution in 68.5 g of ammonium carbonate and 1 liter of water by passing in carbon dioxide to form basic zirconium carbonate. This is filtered off and washed. The carbonated dizirconiumtrioxy heptahydrate obtained contains about 123 g of zirconium oxide and less than 0.01% of alkali oxides.

What is claimed is:

1. A process for the preparation of high purity basic zirconium carbonate comprising:
   (a) precipitating basic zirconium sulfate by adding a compound selected from the group consisting of alkali or ammonium carbonate and alkali or ammonium hydrogen carbonate to an aqueous solution of zirconium sulfate and separating the precipitate from the mother liquor;
   (b) dissolving the basic zirconium sulfate from step (a) at temperatures not more than about 40° C. in a 0.3 N to 1 N HCl solution such that 0.5 to 1.5 liters of HCl solution is used for each mole of zirconium sulfate used in step (a), and then heating the solution to a temperature of at least 45° C. to reprecipitate the basic zirconium sulfate and separating the precipitate; and
   (c) suspending the basic zirconium sulfate in water to which the stoichiometric amount of a compound selected from the group consisting of alkali or ammonium carbonate and alkali or ammonium hydrogen carbonate is added and removing the basic zirconium carbonate formed from the solution wherein said basic zirconium carbonate contains substantially less impurities, based on the zirconium oxide content, than were present in the zirconium sulfate solution of step (a).

2. The process of claim 1 wherein a freshly prepared aqueous solution of zirconium sulfate is used in step (a).

3. The process of claim 1 or 2 wherein a 0.5 to 1 molar solution of zirconium sulfate is used in step (a).

4. The process of claim 1 or 2 wherein the basic zirconium sulfate in step (a) is precipitated in the presence of alkali or ammonium chloride.

5. The process of claim 1 or 2 wherein the basic zirconium sulfate in step (b) is dissolved in 0.5 to 0.7 molar hydrochloric acid.

6. The process of claim 1 wherein the hydrochloric acid contains 20 to 70 g of alkali or ammonium chloride per liter of hydrochloric acid.

7. The process of claim 1 or 2 wherein in step (b), the solution of the basic zirconium sulfate is heated to a temperature of at least 70° C.

8. The process of claim 1 or 2 wherein in step (c), 0.1 mole of basic zirconium sulfate is suspended in 0.5 to 1.0 liter of water.

9. The process of claim 1 wherein ammonium carbonate is added to the suspension of basic zirconium sulfate and $CO_2$ is added to the aqueous suspension in an amount sufficient to saturate the solution.

10. The process of claim 1 wherein the basic zirconium sulfate in step (b) is dissolved in from about 0.5 to 1.5 liters of 0.5 N to 0.7 N hydrochloric acid.

11. The process of claim 1 or 2 wherein the basic zirconium sulfate in step (a) is precipitated in the presence of 0.5 to 1 mole of alkali or ammonium chloride per mole of zirconium sulfate.

12. The process of claim 1 or 2 wherein the hydrochloric acid used in step (b) contains alkali or ammonium chloride.

13. The process of claim 1 or 2 wherein ammonium carbonate is added to the suspension of basic zirconium sulfate of step (c) and $CO_2$ is added to the aqueous suspension in an amount sufficient to form ammonium hydrogen carbonate in situ.

14. The process of claim 1 or 2 wherein the basic zirconium sulfate from step (b) is further treated by dissolving it in sulfuric acid to convert it to neutral zirconium sulfate which is then treated in the manner of steps (a) and (b) prior to supplying the basic zirconium sulfate to step (c).

* * * * *